United States Patent
Davis et al.

(10) Patent No.: US 9,374,364 B2
(45) Date of Patent: Jun. 21, 2016

(54) METHOD AND SYSTEM FOR IMPLEMENTING VIDEO TWO FACTOR AUTHENTICATION

(71) Applicants: Evan Davis, Santaquin, UT (US); Mitch Felling, Holladay, UT (US); Lyle Hardy, Holladay, UT (US); Justin Long, West Jordan, UT (US)

(72) Inventors: Evan Davis, Santaquin, UT (US); Mitch Felling, Holladay, UT (US); Lyle Hardy, Holladay, UT (US); Justin Long, West Jordan, UT (US)

(73) Assignee: Teleperformance SE, Paris (FR)

( * ) Notice: Subject to any disclaimer, the term of this patent is extended or adjusted under 35 U.S.C. 154(b) by 0 days.

(21) Appl. No.: 14/055,747

(22) Filed: Oct. 16, 2013

(65) Prior Publication Data
US 2015/0106897 A1 Apr. 16, 2015

(51) Int. Cl.
G06F 7/04 (2006.01)
H04L 29/06 (2006.01)
G06F 21/32 (2013.01)

(52) U.S. Cl.
CPC ............ *H04L 63/083* (2013.01); *G06F 21/32* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 2002/0175211 A1* | 11/2002 | Dominquez et al. | 235/492 |
| 2007/0117082 A1* | 5/2007 | Winneg et al. | 434/350 |
| 2007/0241861 A1* | 10/2007 | Venkatanna et al. | 340/5.52 |
| 2007/0265949 A1 | 11/2007 | Elder | |
| 2011/0276445 A1* | 11/2011 | Chess | 705/32 |
| 2012/0180115 A1* | 7/2012 | Maitland | G06F 21/34 726/7 |

FOREIGN PATENT DOCUMENTS

| | | |
|---|---|---|
| JP | 2007-058742 | 3/2007 |
| JP | 2010-278543 | 12/2010 |
| JP | 2012-049756 | 3/2012 |
| WO | 98-44714 | 10/1998 |

* cited by examiner

*Primary Examiner* — Fatoumata Traore

(57) ABSTRACT

A method for authentication includes receiving a log-in request at a first client computer, and capturing user information with the request. The method includes capturing an image of the user, and sending a request for authentication, including the user information and image, to an authentication server. The method includes determining a representative user based on the user information, and determining an authorizing agent responsible for authorizing the representative user. The method includes sending the authentication request to a client computer associated with the authorizing agent, and providing verified identification information of the representative user along with the request so that the authorizing agent can perform authentication of the requesting user based on the user information, the captured image, and the verified identification information. The method includes receiving a result of the authentication, and controlling access by the first client computer to a secure data center based on the result.

20 Claims, 12 Drawing Sheets

METHOD AND SYSTEM FOR IMPLEMENTING VIDEO TWO FACTOR AUTHENTICATION

BACKGROUND

A call center handles large volumes of requests by telephone or other similar communication technologies. For instance, these call centers are established to provide support and/or information to callers regarding products and/or services. The call center may be operated by the company associated with the product or service, or a third party assigned to provide customer support. As an advantage, collective handling of calls throughout a network of work stations manned by service representatives or agents promotes a hands on approach when dealing with customers in that the call center is configured to enable a large number of calls to be handled on a personal basis.

In one implementation, an inbound call center manages incoming calls to provide services to incoming callers. For example, an inbound center may provide support to complete a sale, handle issues and problems with products (e.g., installation instructions, warranty service, etc.), handle calls related to services (e.g., banking, collections, police, fire, alarm, etc.), and other similar types of services.

In another implementation, an outbound call center initiates calls. For instance, the center may be configured to provide telemarketing for a product or service, enable the solicitation of charitable or political donations, provide debt collection services, perform polling or market research, etc.

Whatever the ultimate purpose of the call center, a call center is composed of many workstations, each assigned to an corresponding agent. A typical call center workstation includes a computer and a telephone or audio headset, as implemented on a working platform, such as a desk. As such, the workstation is compartmentalized as a unit to provide everything that a service agent needs in a minimum amount of space. In many instances, the agent's computer is coupled to a computer network providing among others, back-end resources, virtual computers, informational databases, a communication path with an immediate supervisor, connection to other call centers, or a routing protocol to further route the call to a more appropriate agent or division.

Many individualized call centers are centralized to provide space for many agents. For example, a larger call center may support hundreds or thousands of work stations in a single building or campus of buildings. In that manner, maintenance and installation of all of the infrastructure (e.g., computers, workstation cubicle, etc.) is centralized.

On the other hand, some call centers may be distributed across multiple locations at a granularity of singular work stations. That is, each agent is able to choose where to operate his or her workstation, such as, in a work-from-home environment. The work-from-home workstation is configured similarly as a workstations located at a centralized campus or building, including connectivity to back-end resources through a communication network.

However, many operational problems exist with work-at-home workstations. In one case, the working environment surrounding a remote workstation is difficult to monitor. Because the workstation is remote from any organization center, the agent is responsible for setting up a suitable and conforming workspace. This workspace environment defining the workstation may impinge upon and be overrun by other parts of the agent's home. For instance, the operating workspace may be confined to a corner of an agent's bedroom, or in any available corner of the living space large enough to fit a computer. Ideally, the workstation should be isolated from other parts of the home, so that the agent can focus entirely on call center tasks. In many cases, it is difficult for a supervisor to inspect the working environment of a corresponding agent, without a personal and physical inspection.

Further, because of the remote working environment, it may prove difficult to monitor the agents themselves. Supervisors may not know whether the agent assigned to a particular workstation is actually working the shift full time or is actually handling both multiple personal and work related tasks. Also, the supervisor may not be aware of the actual person operating the workstation. Although a particular agent is assigned to a work-at-home workstation, it may be an entirely different person who is actually seated at that workstation (e.g., spouse, friend, child, family member, etc.). For instance, the agent may be ill, but still would like credit for working a shift, and has a family friend handle the calls assigned to the workstation.

SUMMARY

In embodiments of the present invention, a computer implemented method for performing video two-factor authentication is described. The method includes receiving a log-in request initiated by a user at a first client computer. In association with the request, the method includes capturing user information. The method includes capturing an image of the user from a live feed operated by the first client computer. The method includes sending a request for authentication of the user to an authentication server, wherein the request comprises the user information and the captured image. The method includes determining a representative user based on the user information, and determining an authorizing agent responsible for authorizing the representative user. The method includes sending the request for authentication to a second client computer associated with the authorizing agent. The method also includes providing verified identification information related to the representative user to the second client computer along with the request so that the authorizing agent can perform authentication of the user based on the user information, the captured image, and the verified identification information. The method includes receiving a result of the authentication, and controlling access by the first client computer to a secure data center based on the result.

In other embodiments of the present invention, a computer implemented for performing video two-factor authentication is described. The method is performed by an authentication server, or access control server providing access to a back-end data center. The method includes receiving a request for authentication from a first client computer, wherein the request comprises user information associated with a log-in request initiated by a user at the first client computer to establish communication with the back-end data center. The back-end data center provides computing resources for the first client computer, and wherein the authentication request comprises an image of the user captured from a live feed at the first client computer. The method includes determining a representative user based on the user information, and determining an authorizing agent responsible for authorizing the representative user. The method includes sending the request for authentication to a second client computer associated with the authorizing agent. The method also includes providing verified identification information related to the representative user to the second client computer along with the request so that the authorizing agent can perform authentication of the user based on the user information, the captured image, and the verified identification information. The method includes receiving a result of the authentication, and controlling access by the first client computer to the back-end data center based on the result.

In another embodiment, a system for performing video two-factor authentication is described. The system includes a first client computer associated with a user, wherein the first client computer is configured to receive a log-in request initiated by the user and capture user information associated with the log-in request. The system includes an image capture device associated with the first client computer, and configured to capture a live feed comprising a plurality of images. In addition, the image capture device is configured to capture an image of the user from the live feed in association with the log-in request. The system includes a back-end data center, wherein the back-end data center provides computing resources to a plurality of client computers, including the first client computer. Further, the back-end data center includes an authentication server that is configured and arranged to receive a request for authentication from the first client computer, wherein the request for authentication comprises the user information and the image of the user; determine a representative user based on said user information; determine an authorizing agent responsible for authorizing the representative user; send the request for authentication to a second client computer associated with the authorizing agent, wherein the second client computer is supported by the back-end data center; provide verified identification information related to the representative user to said second client computer along with the request so that the authorizing agent can perform authentication of the user based on the user information, the captured image, and the verified identification information; receive results of the authentication; and control access by the first client computer to the back-end data center based on the results.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "capturing," "receiving," "sending," "determining," "providing," "controlling," "interrupting," or the like, refer to actions and processes (e.g., flowcharts 300, 400, and 500 of FIGS. 3-5, respectively) of a computer system or similar electronic computing device or processor (e.g., system 100). The computer system or similar electronic computing device manipulates and transforms data represented as physical (electronic) quantities within the computer system memories, registers or other such information storage, transmission or display devices.

Figure 3:
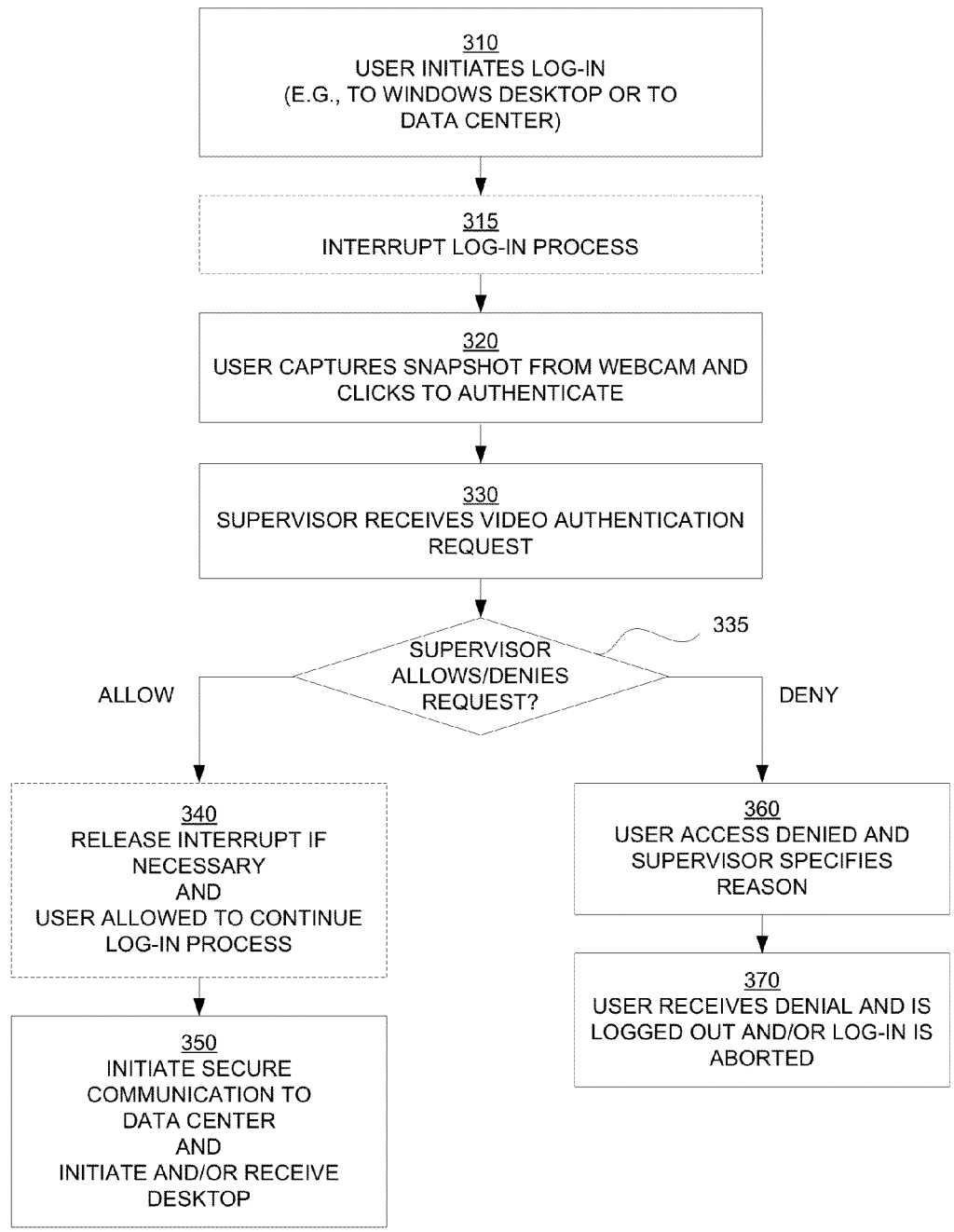
FIG. 3 is a flow diagram illustrating a method for performing video authentication, in accordance with one embodiment of the present disclosure.
Figure 4:
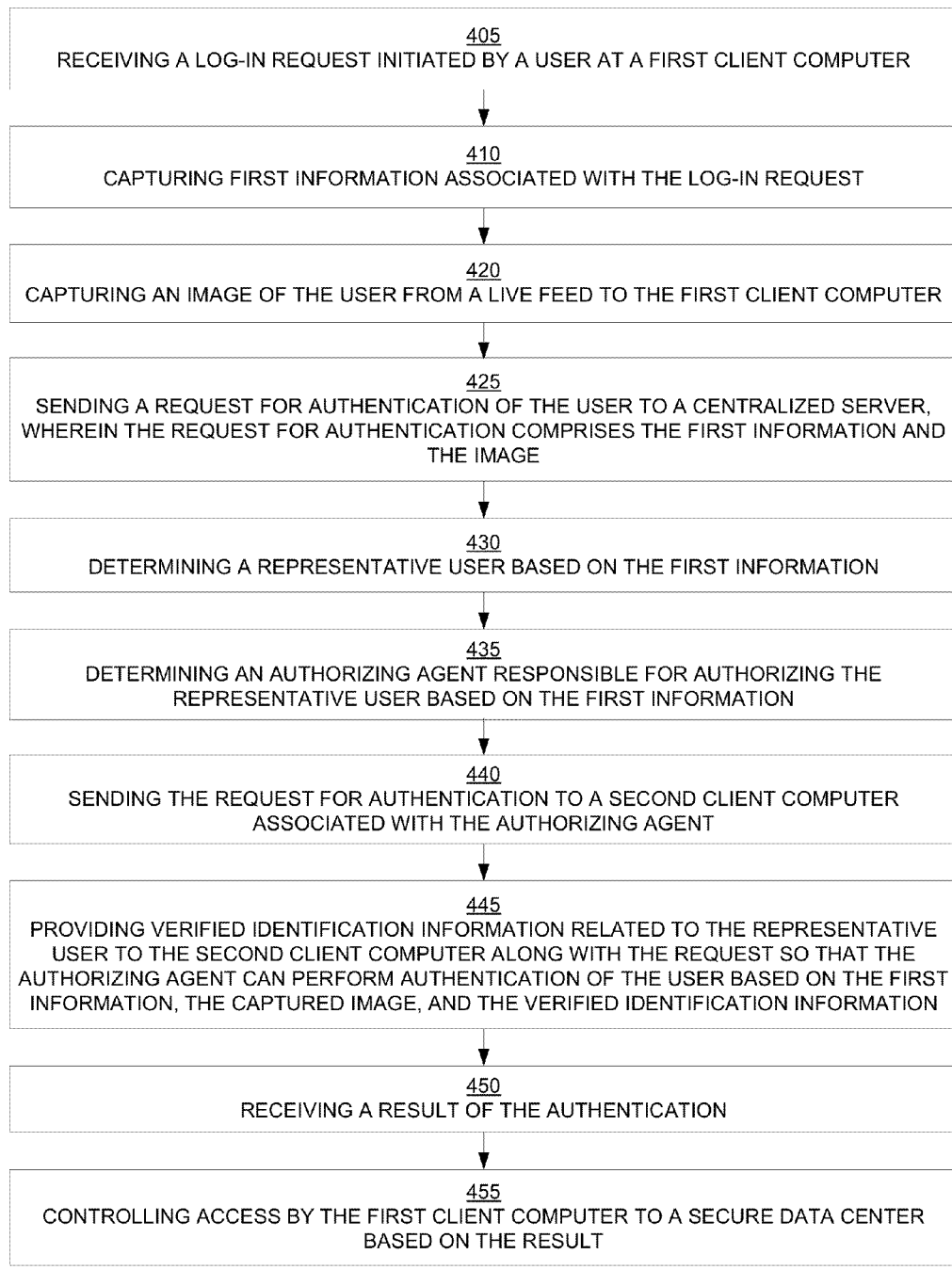
FIG. 4 is a flow diagram illustrating a detailed method for performing two-factor authentication including a human implemented video authentication, in accordance with one embodiment of the present disclosure.
Figure 5:
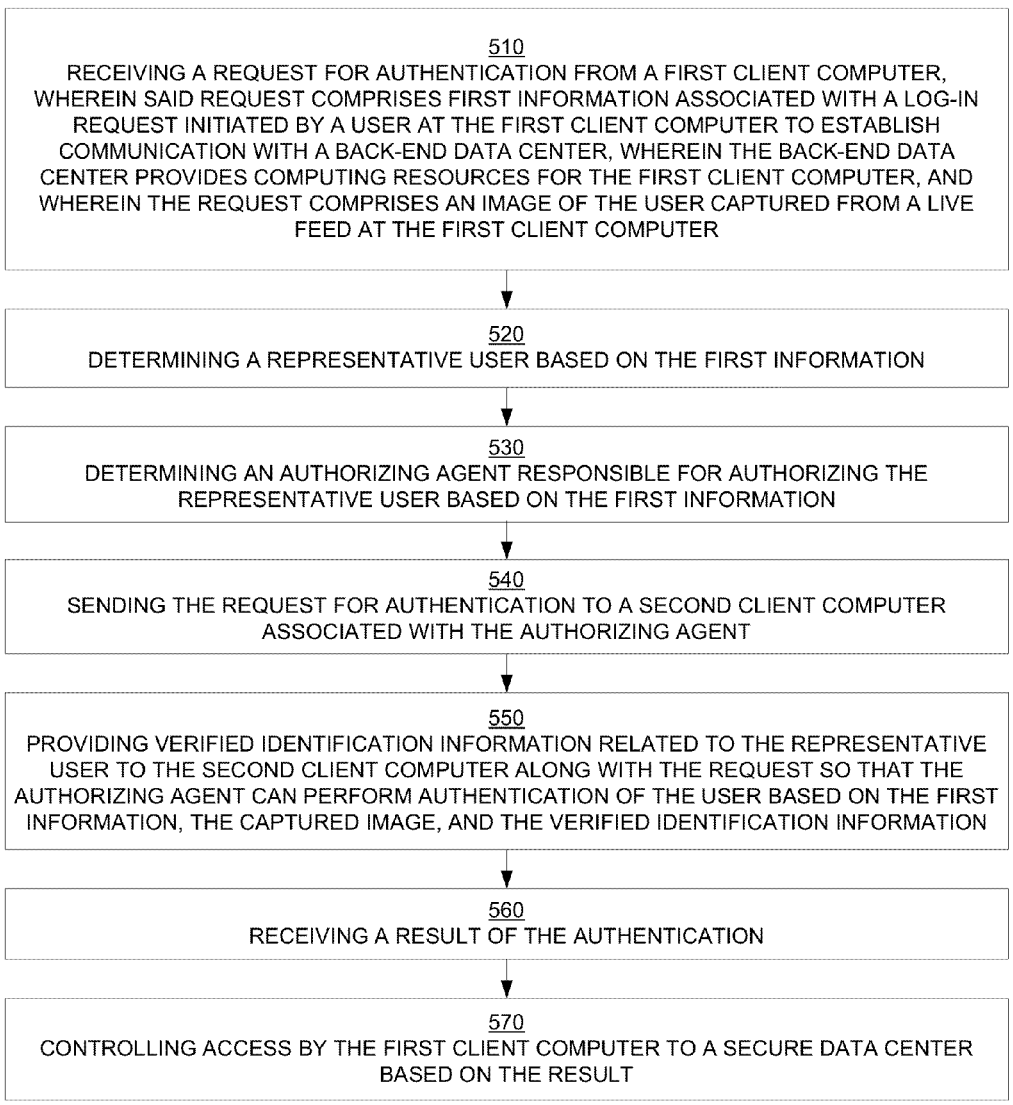
FIG. 5 is a flow diagram illustrating a method for performing two-factor authentication performed at an authentication server of a back-end data center, in accordance with one embodiment of the present disclosure.

FIGS. 3-5 are flowcharts of examples of computer-implemented methods for implementing two-factor authentication including a human implemented video authentication according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
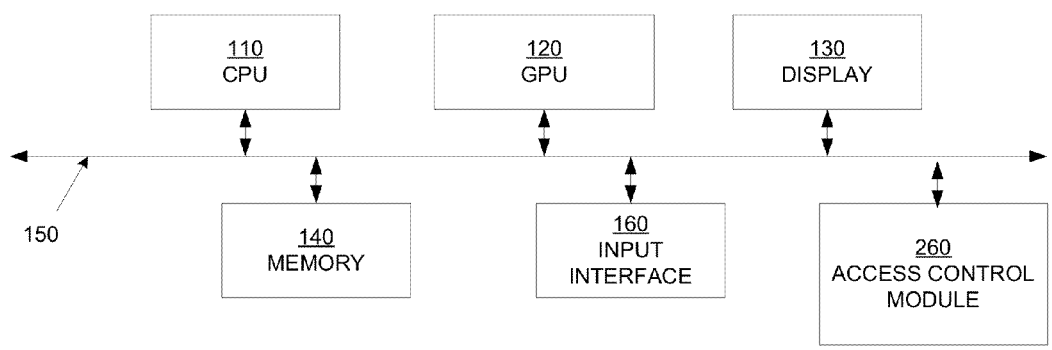
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad). System 100 also includes an access control module 260 that is configured for implementing a two-factor authentication including a human implemented video authentication. Access control module 260 is further described in FIG. 2 below.

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
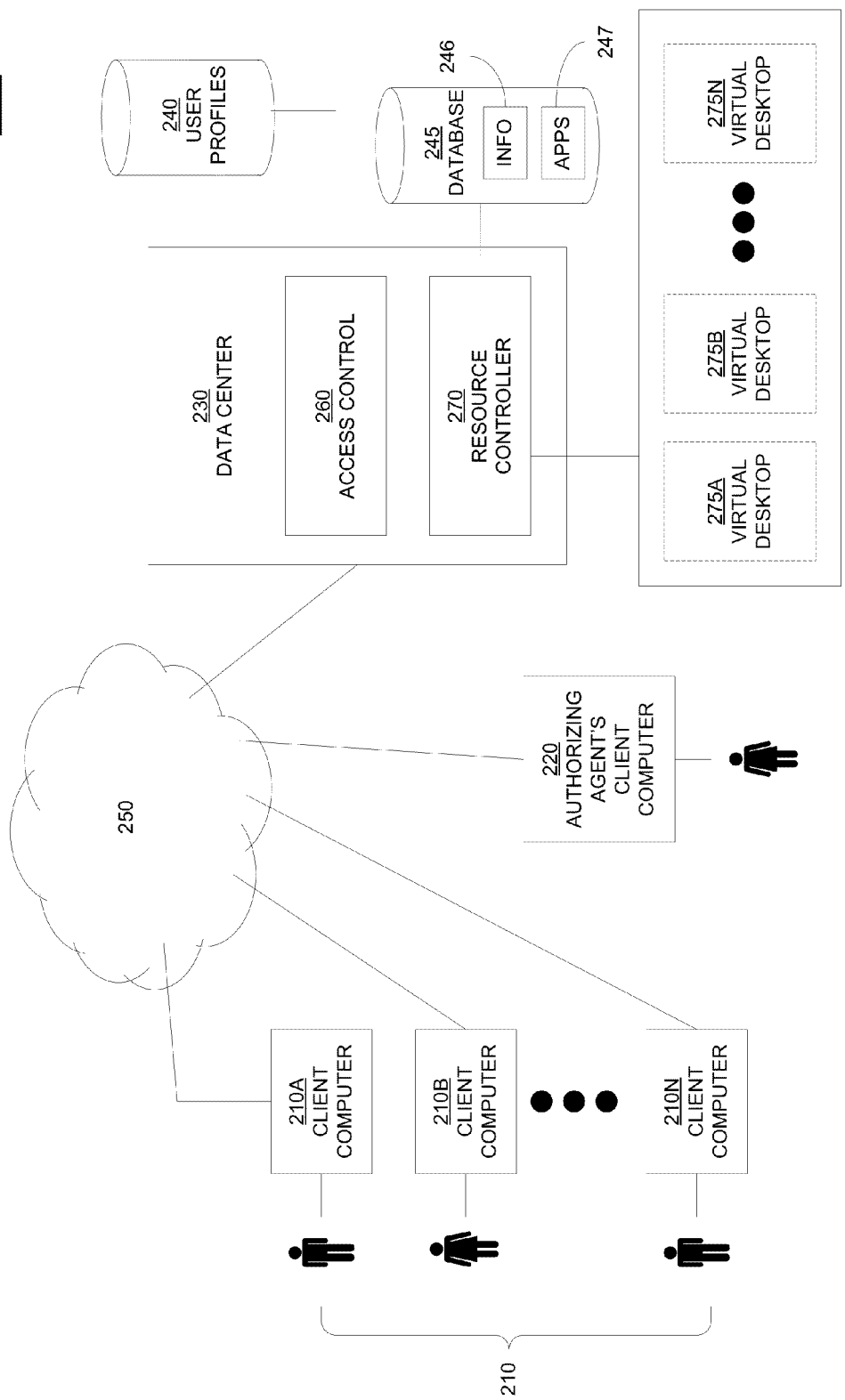
FIG. 2 is a diagram of networked system configured for implementing video two-factor authentication, in accordance with one embodiment of the present disclosure.

FIG. 2 is a block diagram of system 200 configured to implement a two-factor authentication including a human implemented video authentication, in accordance with one embodiment of the present disclosure. For instance, system 200 may be a contact center or call center that provides support and information on an incoming and/or outgoing basis.

As shown, system 200 includes a plurality of client computers 210, each of which is associated with a human agent. For instance, a client computer is part of a workstation configured to help a corresponding agent handle contact center requests. One or more of the client computers (e.g., 210A-N) may take on any form that is capable of providing stand-alone processing power, reliance on back-end servers for processing power, or a mixture of both. In one embodiment, the client computer comprises a thin client that is coupled to a back end server providing resources. That is, the thin client includes minimal processing power, an interface, and means for interacting with the interface (e.g., screen, mouse, and keyboard) to connect back to the back-end server. For instance, the back end server may provide virtual desktops, each including a virtual computer with memory, all supported by a desktop controller that distributes access and use of the physical memory and hardware amongst the plurality of virtual desktops. In other embodiments, the client computer comprises any type of networked devices that is capable of providing an interface to resources located at a back-end server (e.g., terminal server, virtual desktop, Citrix server, etc.).

Each of the workstations associated with a client computer and an agent may be located at a central location, such as within a campus of buildings supporting a contact or call center, in one implementation. In another instance, the contact or call center comprises a distributed network of workstations, wherein one or more workstations are remotely located, such as, in a work-from-home environment. In other configurations, the contact or call center may comprise a mixture of a cluster of centrally located workstations and distributed workstations.

In particular, the plurality of client computers 210 includes a first client computer that is associated with a user, such as an agent. As previously described, the client computer is used by the agent to access resources located at a back-end server. For instance, resources may include processing power, applications, information, etc. that are used to perform tasks assigned to the agent, such as, those related to a contact center. Further, in accordance with one embodiment of the present disclosure with one embodiment, the first client computer configured to receive a log-in request initiated by said user and capture user information associated with said log-in request. This information is used to initiate the two factor authentication process including a human implemented video authentication process. Also, the first client computer includes an image capture device that is configured to capture a live feed comprising a plurality of images, and wherein the image capture device is configurable to capture an image of the user from the live feed in association with the log-in request.

As shown in FIG. 2, each of the plurality of client computers 210 is communicatively coupled to a data center 230 through a network 250. The network 250 includes links and nodes that are dynamically coupled together to create a communication path between two terminal nodes, such as a client computer and the data center 230. For instance, a signal delivered between a client computer and the data center 230 may be switched (e.g., circuit switch, message switch, packet switch, etc.) and/or routed between nodes within network 250. For instance, network 250 includes the internet, computer networks, local area networks (LANs), wide area networks, telephone networks, etc.

In addition, system 200 may include a client computer associated with an authorizing agent, in accordance with one embodiment of the present disclosure. For instance, an authorizing agent includes a supervisor who manages work related responsibilities for one or more agents associated with the plurality of client computers 210. In embodiments of the present invention, the authorizing agent provides the human implemented video authentication in the two-factor authentication process.

System 200 includes the data center 230. For instance, data center 230 is configured to provide information and resources for agents to perform work related responsibilities (e.g., for a contact center). Data center 230 includes an access control module 260 configured for implementing a two factor authentication process of embodiments of the invention. A user profile database 240 includes information associated with authorized agents (e.g., user name, employee identification number, work address, supervisor, etc.). Further database 240 is configured to provide information to the access control module 260 for implementing the two factor authentication including human implemented video authentication.

Center 230 also includes a resource controller 270 configured to provide one or more resources to the plurality of client computers 210. For instance, the client computer may comprise a low-level computing device with limited processing power and resources (e.g., thin client), which is configured to use resources located at a back end-server, such as resources managed and located at the data center 230. In one implementation, the resource controller 270 may manage one or more virtual desktops (e.g., 27A-N) for use by the plurality of client computers 210. That is, the hardware resources located or managed by the resource controller 270 are remotely located from each of the plurality of client computer 210. One or more virtual desktops 275A-N are partitioned out from the physical resources, and are available to the client computers 210.

Furthermore, resource controller 270 provides access to database 245 that is configured for storing information 246, applications 247, and other forms of data. For instance, an agent provides assistance to customers of a company, such as, Company A. As such, the client computer (e.g., 210A) associated with the agent accesses and loads a particular application in the database of applications 247 that is tailored to the services provided by Company A. In addition, the agent is also able to access information in the database of information 246 that is related to Company A. For instance, the tailored application accesses that information related to Company A when the agent is executing the application.

As an example, in one representative use case, Company A sells Product X, which is advertised through various media. A customer reaches out to a contact center to make inquiries about Product X. The contact center connects the customer to an agent who is representing Company A during his or her work shift. The data center 230 supports the contact center, and as such, the client computer associated with the agent is loaded with an application from the database of applications 247 corresponding to Company A, wherein the application is configured to help the agent through various customer scenarios (e.g., purchase, request for product information, etc.). The agent through the application is able to access information related to Product X that is stored in the database of information 246.

FIG. 3 is a flow diagram 300 illustrating a method for performing video based authentication, in accordance with one embodiment of the present disclosure. The video based authentication includes a human implemented video authentication of the requesting user or agent. Implementation of a human based authentication process is more economical and potentially more accurate over other digitally based authentication methods (e.g., SecureID, etc.). The video based authentication process is useful in authenticating a requesting user who is trying to access resources at a contact center, wherein a successful authentication as performed by a manager or supervisor allows the requesting user to begin or restart a shift at the contact center.

The video based authentication process disclosed in flow diagram 300 is initiated through a log-in process implemented by a requesting user. For instance, at 310, the user initiates a log-in either to the desktop of an associated client computer, wherein the client computer comprises sufficient processing power to run one or more applications. In that case, the desktop is associated with an operating system loaded on the client computer, which may be further coupled to a back-end data center for purposes of embodiments of the present invention. In other implementations, the client computer comprises a minimum of processing power (e.g., as a thin client), and is configured solely to connect back to the back-end data center.

At 315, the log-in process to the desktop is interrupted. In the case where the associated client computer has sufficient processing power to include a desktop of an operating system, the log-in is directed towards accessing the desktop. Once logged in, the user is able to access resources (e.g., information and applications located internally or at a back-end data center) necessary to perform work related tasks. However, before the log-in is completed, an authentication process is initiated to verify the requesting user.

On the other hand, the log-in process may include the video based authentication. That is, in the case where the associated client computer is configured to access the data center directly (e.g., where the client computer comprises a thin client) through the log-in, the requesting user is also prompted for participation in the authentication process.

At 320, the user captures a snapshot from an image capturing device (e.g., video camera) and clicks to authenticate. For instance, a USB (universal serial bus) web camera is configurable to capture a live "snapshot" of the user requesting authentication, and send that snapshot over the internet to another device. In one implementation, the user frames the image (e.g., a head shot) and actuates a button to capture the image. In other embodiments, a sequence of images, or a video of the requesting user is captured and used in the authentication process. Once captured, the captured image or images are submitted for authenticating the requesting user to his or her supervisor.

At 330, the supervisor receives the video authentication request. At 335, the supervisor allows or denies the authentication request by comparing the captured image or images against an employee photo stored in a database (e.g., stored in user profiles of data base 240). As such, a human based video authentication process is implemented to authenticate the requesting user. The supervisor is ideally situated to determine whether the requesting user is actually the person he or she is representing himself or herself as a bona-fide agent. The supervisor is personally familiar with the bona-fide agent, knows additional information (e.g., the bona fide agent's work schedule), and has access to other verifying information related to the authorized agent (e.g., stored and authorized images).

At 360, if the supervisor denies the request for authentication, then user access is denied to the resources available through the back-end data center. That is, if the supervisor decides that video authentication fails for whatever reason, then access is denied, and the supervisor specifies a reason for the denial. For instance, the captured image of the requesting user may not match the employee photo stored in association with a represented and bona-fide agent. In another case, the captured image may match the employee photo, but the bonafide agent is not scheduled to work the present shift. Further, at 370, the user receives the denial of authentication. More specifically, the log-in process is aborted, and/or the user is logged of the corresponding client computer.

On the other hand, if the supervisor allows the request for authentication, then user access to the resources available through the back-end data center is provided. More specifically, at 340, the interrupt on the log-in process is released, if necessary, and the user is allowed to complete the log-in process. For instance, if an interrupt was initiated on a log-in to the operating system's desktop, after successful authentication, the log-in process is allowed to complete (allow or deny access to the desktop). Successful completion of the log-in allows access to and display of the desktop. Further, at 350, after successful authentication, secure communication is initiated between the client computer associated with the now authorized agent and the back-end data center.

FIG. 4 is a flow diagram 400 illustrating a detailed method for performing two-factor authentication including a human implemented video authentication, in accordance with one embodiment of the present disclosure. For instance, the method of authentication is performed to authorize access to resources located at a back-end data center by a remote client computer and associated requesting user.

Figure 6A:
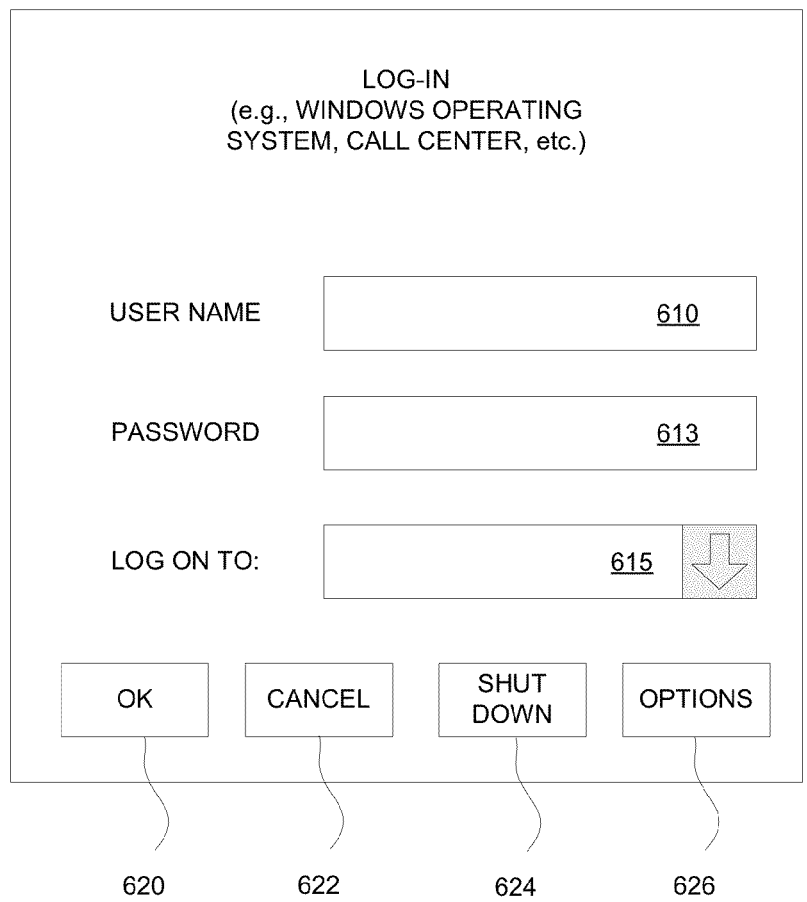
FIG. 6A is a screen shot of a log-in window used for initiating a two-factor authentication to a back-end data center, in accordance with one embodiment of the present disclosure.

At 405, the method includes receiving a log-in request that is initiated by a user at a first client computer. As previously described, the client computer may be located in a work-at-home environment or in a centrally located building or campus. In one implementation, the log-in request triggers or initiates a separate authentication process. In another implementation, the log-in request includes the authentication process. As an example, FIG. 6A is a screen shot of a log-in window 600A used for initiating a two-factor authentication to a back-end data center, in accordance with one embodiment of the present disclosure. The log-in may be for a desktop to a operating system (e.g., Windows OS®), or for access to resources at a back-end data center (e.g., at a call center). In particular, the log-in request is received or intercepted by the first client computer, and before fully executing the log-in request the remaining operations of a two-factor authentication process is performed. For instance, the method includes presenting a log-in window for authorizing access to a desktop operated by the first client computer, or for directly authorizing access to resources available at a back-end data center. Once the log-in request is received, the log-in process is interrupted.

At 410, the method includes capturing first information (e.g., user information) associated with the log-in request. For instance, that information may include user name and password. This information may be used for the first level or first factor of authentication. For example, as shown in FIG. 6A, the log-in includes a "user name" field 610 for the user requesting access to input a name that is to be used for authentication. That is, the requesting user is representing himself or herself as a person associated with the name. Additionally, a "password" field 613 is included for the user to input an alpha and/or numeric password.

Once the appropriate information is entered, the user is able to initiate the log-in process by selecting the "OK" button 620. A "cancel" button 622 is also available should the user wish to cancel the log-in process. Also, since window 600A is used to initiate the client computer, a "shut down" button 624 is available should the user wish to power the computer down. Other options are available through an "options" button 626

Figure 6B:
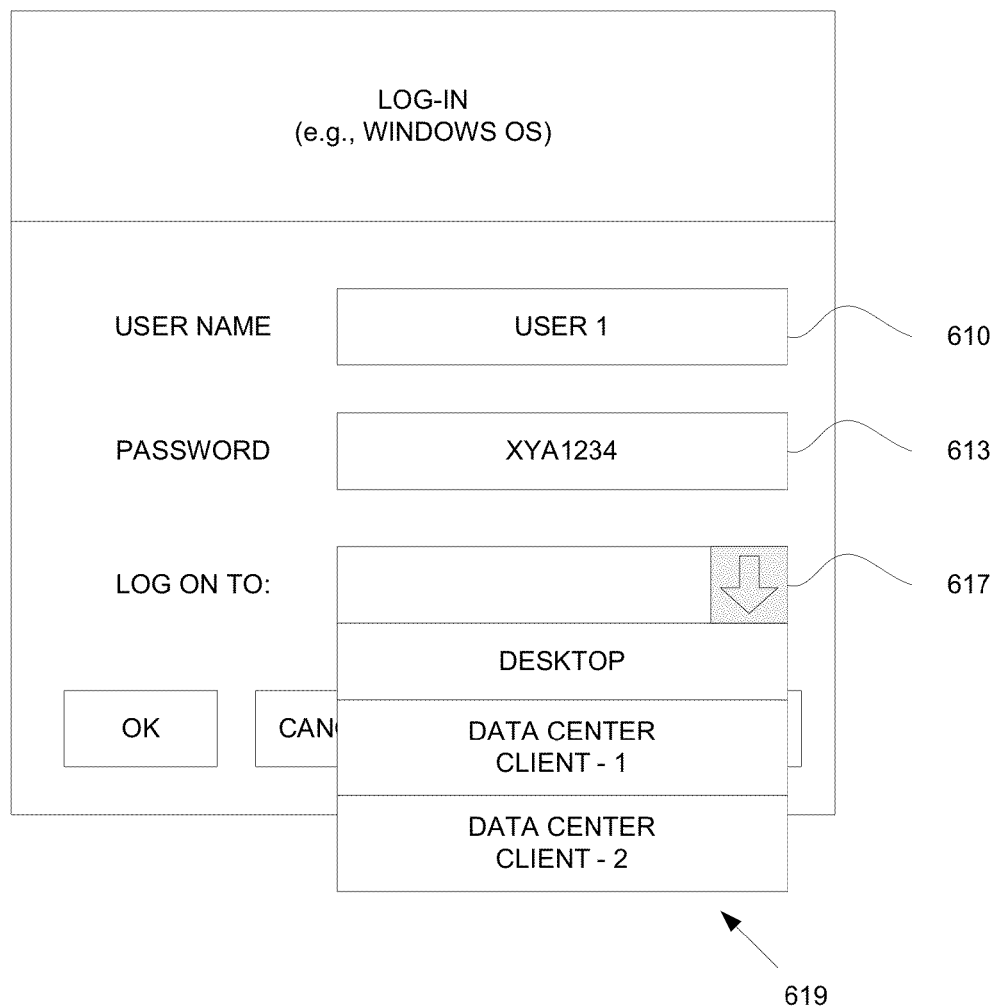
FIG. 6B is a screen shot of the log-in window of FIG. 6A including information provided by a user initiating the log-in process, in accordance with one embodiment of the present disclosure.

As shown in FIGS. 6A-B, a field 615 is available for the user to designate to which system the log-in is directed. For instance, by selecting the pull down arrow 617 a menu of items is available for selection. If configured properly, the user may select to log-in to the desktop, or to client-1 of the data center, or client-2 of the data center. For instance, access to resources may be dependent on which client the authorized user will be representing to third parties (e.g., to requesting callers in a contact center). Client-1 and client-2 may be associated with their own set of applications, interfaces, and information.

The user typically indicates when to start the log-in. That is, once all the information has been entered, the user will hit the activation button (e.g., "OK" button 620) to hand over execution of the log-in. In embodiments of the present invention, before the log-in process is completed the authentication process begins. That is, if the log-in and authentication processes are separate, then the log-in is interrupted and will not continue until the authentication process has executed. On the other hand, if the authentication process is included within the log-in process, then the authentication process must be complete before all portions of the log-in can be completed. In either case, the two-factor authentication process is implemented.

Returning back to FIG. 4, at 420, as part of the video authentication of the two-factor authentication process, the method includes capturing an image of the user from a live feed to the first client computer. That is, the client computer is configurable to initiate a live feed of the surrounding environment, and is configurable to capture at least one image. In one embodiment, the user is prompted to capture an appropriate "live" image of the user, or in other words a request is presented for the user to capture a facial image for purposes of authentication. As such, the user properly frames himself or herself within the view of the lens of the image capturing device, and initiates a capture of that framed image.

Figure 6C:
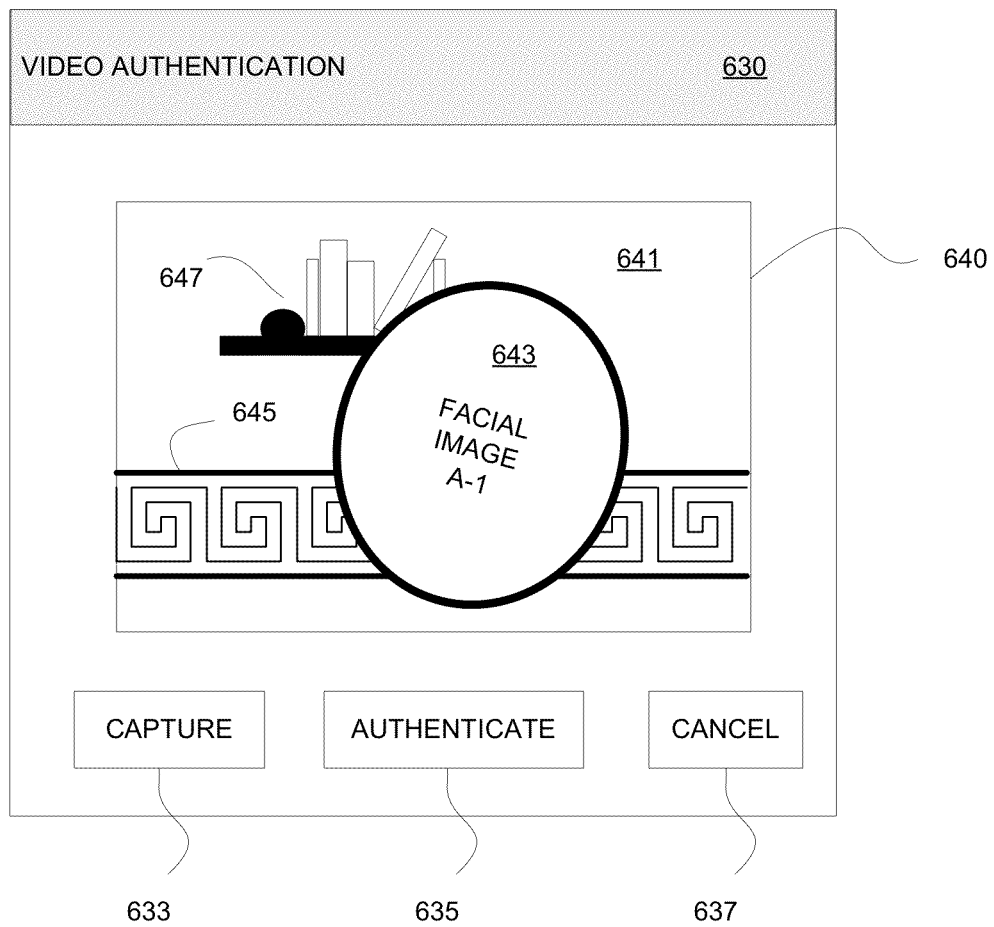
FIG. 6C is a screen shot of a client computer associated with the user initiating a log-in process illustrating a live-feed used to capture an image of the user for purposes of performing two-factor video authentication, in accordance with one embodiment of the present disclosure.

For example, FIG. 6C is a screen shot 600C taken from a client computer that is associated with the user initiating a log-in process, and illustrating a live-feed used to capture an image of the user for purposes of performing two-factor video authentication, in accordance with one embodiment of the present disclosure. As shown, title bar 630 indicates that screen shot 600C is implementing a video authentication of the requesting user. The client computer is configurable to obtain a live feed from an image capturing device, wherein the live feed is displayed within a window 640. In FIG. 6C, window 640 shows one image of a plurality of images in the live feed that are ready for capture and storage. Once the requesting user frames the image by aligning or placing his or her face within the view of the image capturing device, the user may capture that image by activating the "capture" button 633. That is, in response to activation of the "capture" button, for example, an image is captured. As shown, a captured image 641 includes facial image A-1 643. The captured image 641 may include other objects such as, books 647 on a bookshelf, and a wall pattern 645. In one embodiment, the captured image includes additional information, such as a time/date stamp and identifying information relating to the user attempting to access the environment (e.g., a username, etc.). The captured image along with the additional information may be further archived at a central server, as will be described below.

In one embodiment, a filtering process is performed at the client computer. Specifically, the client computer is configurable to determine whether the captured image 641 meets a threshold, or rather the facial image A-1 643 meets a threshold (e.g., has high enough resolution, is of sufficient size, is within a range of focus, etc.). If the captured image does not meet the threshold, then the user may be prompted to capture another image. On the other hand, if the image meets the threshold, then the captured image 641 is attached to a request for authentication that is delivered to the back-end data center (e.g., the access control module 260 of FIG. 2).

In particular, returning back to FIG. 4, the method includes at 425 sending a request for authentication of the requesting user to an authentication server (e.g., access control module 260 of FIG. 2), wherein the request for authentication includes the user information and the captured image. The user information is useful for the first factor authentication process, and the captured image is useful in the second factor authentication process.

In the first factor authentication process, the user information provides a first level of authentication. In particular, the user information is authenticated in association with the representative user. For instance, if the user information includes a user name and password, then that pair can be checked against an authorized list of user name/password pairs, wherein the user names are representative and/or authorized users. If the user name/password pair matches one on the authorized list, then the user has successfully passed the first level of authentication. That is, the user name, as a representative user, is authorized (e.g., a verified employee) and the password in association with the user name is valid. On the other hand, if the user/name password pair does not match one on the authorized list, then the user fails both the authentication process, and the log-in process. At that point, the log-in process is aborted, and the requesting user is denied access to back end resources.

In the second factor authentication process, the captured image provides a second level of authentication, including a human implemented video authentication process. In particular, at 430 the method includes at the authentication server or back-end data center determining a representative user based on the user information. For instance, the user information is associated with a known user (e.g., employee, agent) that may be authorized or unauthorized. That is, the requesting user is representing himself or herself as that representative user, when logging in with the user information.

At 435, the method includes at the authentication server determining an authorizing agent responsible for authorizing the representative user based on the first information. For instance, once the representative user is determined, a list may be used to determine the authorizing agent. In one implementation, the authorizing agent is the user's supervisor.

Figure 6D:
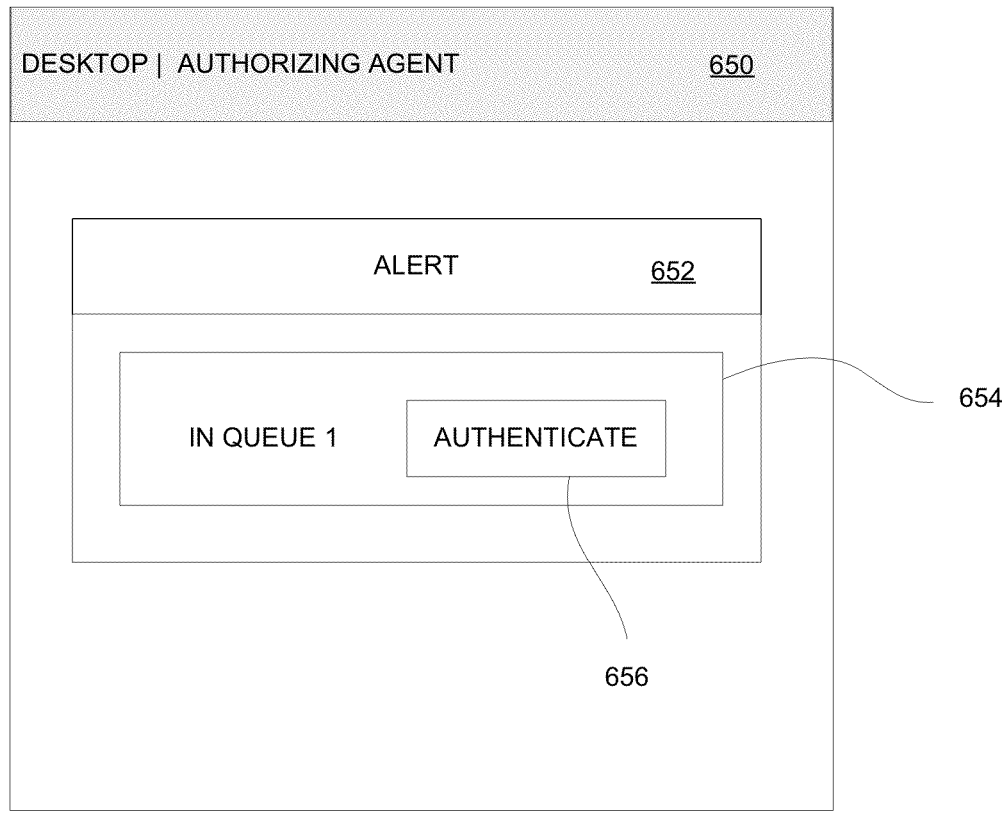
FIG. 6D is a screen shot of a client computer associated with an authorizing agent illustrating an alert that a request for authentication needs attention, in accordance with one embodiment of the present disclosure.

At 440, the method includes sending the request for authentication from the authentication server to a second client computer that is associated with the authorizing agent. In one implementation, the request is delivered to the second client computer after successful authentication of the user information, i.e., in the first factor authentication process. For example, FIG. 6D is a screen shot 600D of a client computer associated with an authorizing agent illustrating an alert 652 that a request for authentication needs attention, in accordance with one embodiment of the present disclosure. Specifically, title bar 650 indicates that screen shot 600D is of the desktop of the authorizing or authorizing agent. The alert 652 indicates that the first item 654 in the queue is an authentication request. When the "authenticate" button 656 is activated, the authorizing agent is presented with the request for authentication, as described below.

Further, the request for authentication includes the user information and the captured image, as previously described. Additionally, at 440, the method includes accessing at the authentication server verified identification information related to the representative user, and providing the verified identification information to the second client computer along with the request for authentication. That is, the request includes the verified identification information. In that manner, the authorizing agent is able to perform video authentication of the user based on the user information, the captured image, and the verified identification information. In particular, the authorizing agent compares the captured image against the verified information to see if there is a match. For example, the verified information includes a static image of the representative user, such as, an official image taken when the representative user when through the employee introduction process with human resources (HR) department. In another implementation, the verified information includes multiple official images for comparison. For example, these images may include previously captured images associated with other successful requests for authentication. That is, the authentication server is configurable to access a previously captured image of the representative user that is associated with a successful authentication of the representative user. Because it was successful, the captured image is verified as being a valid image of the representative user. The authentication server is also configurable to attach the previously captured image to the request for authentication that is delivered to the second client computer.

Though embodiments of the present invention are described within the context of performing two-factor authentication with a human implemented video authentication, other embodiments are well suited to performing video authentication using automated methods and algorithms. For instance, facial recognition algorithms may be used to perform the comparison between the captured image and the verified image.

Figure 6E:
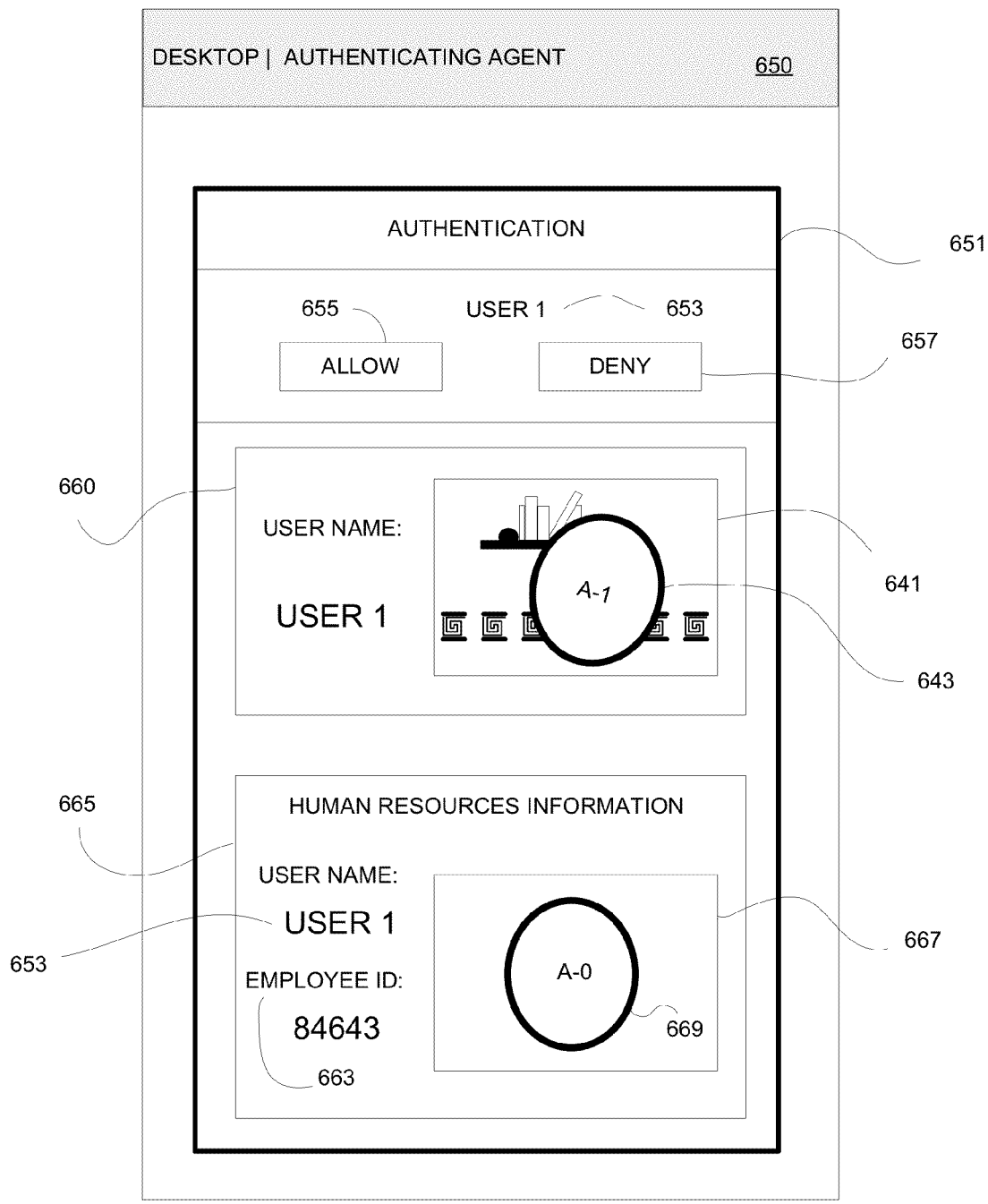
FIG. 6E is a screen shot of a client computer associated with an authorizing agent illustrating the comparison of user information included in the log-in request and a captured image of the user against verified identification information, in accordance with one embodiment of the present disclosure.

FIG. 6E is a screen shot 600E of the second client computer associated with the authorizing agent illustrating the comparison of user information included in the log-in request and a captured image of the user against verified identification information, in accordance with one embodiment of the present disclosure. In particular, title bar 650 indicates that the screen shot 600E is taken from the client computer of the authorizing agent. Window 651 provides the authentication interface for the authorizing agent after the "authenticate" button 656 of FIG. 6D is activated. As such, user 1 653 is the representative or official user.

In particular, the authentication window 651 includes the captured image 641, which includes the facial image A-1 643 taken of the requesting user. The requesting user is trying to authenticate as the representative user, or user 1 653. In addition, authentication window 651 includes the verified information 665 that is associated with the representative user 1 653. One or more items of information may be included as the verified information 665, to include the employee identification number 663 (e.g., 84643). Additionally, an official image 667 of user 1 is included as verified information. The official image 667 includes a facial image A-0 669 of user 1, which can be compared against the facial image A-1 643 of the requesting user.

In particular, if there is a reasonable likeliness between the facial image A-0 669 and facial image A-1 643 as determined by the authorizing agent, then the video authentication is successful. In that case, when the authorizing agent determines that the request for authentication is successful, then the "allow" button 655 is activated, and that result is delivered to the authentication server. Also, the captured image may be stored in association with the log-in request and request for authentication, along with other information, such as, a time stamp, computer identifier, user name, etc. On the other hand, if there is no reasonable likeliness between the facial image A-0 669 and facial image A-1 643 as determined by the authorizing agent, then the video authentication is not successful. In that case, when the authorizing agent determines that the request for authentication is unsuccessful, the "deny" button 657 is activated. Results of the video authentication are delivered from the second client computer to the data center (e.g., access control 260) along with other information (e.g., captured image, user name, time stamp etc.) whether the authentication was successful or unsuccessful.

Returning back to FIG. 4, at 450 the method includes receiving a result of the video authentication at the data center (e.g., access control 260). At 455 the method includes controlling access to a back-end data center based on the result. More particularly, at 455, access is controlled to one or more resources (e.g., applications, information, etc.) located at the secure and back end data center based on the result. For instance, access to the resources is granted based on a successful video authentication. On the other hand, access is denied based on an unsuccessful video authentication.

Figure 6F:
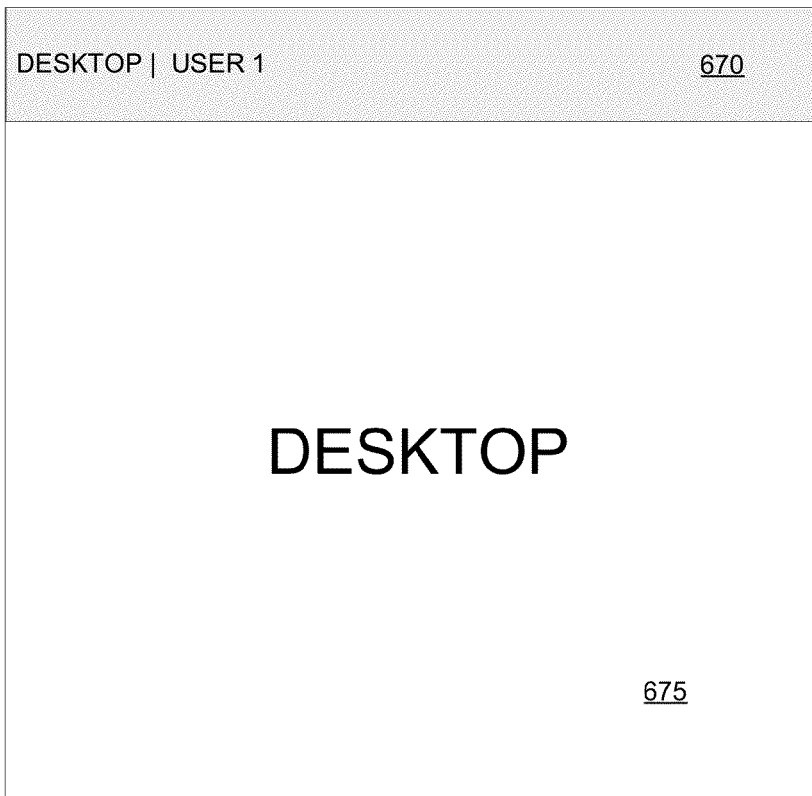
FIG. 6F is a screen shot of a desktop window of a client computer associated with the user initiating a log-in process, wherein the user has been successfully authenticated, in accordance with one embodiment of the present disclosure.

FIG. 6F is a screen shot of a desktop window of a client computer associated with the user initiating a log-in process, wherein the requesting user has been successfully authenticated, in accordance with one embodiment of the present disclosure. Specifically, title bar 670 indicates that the screen shot 600F is taken from the desktop 675 of the requesting user, now identified as user 1. That is, after successful authentication, the log-in process is allowed to complete, and the desktop is presented on the first client computer. In addition, because access is allowed to resources located at the back-end data center, a remote communication session is established between the secure data center and the first client computer.

Figure 6G:
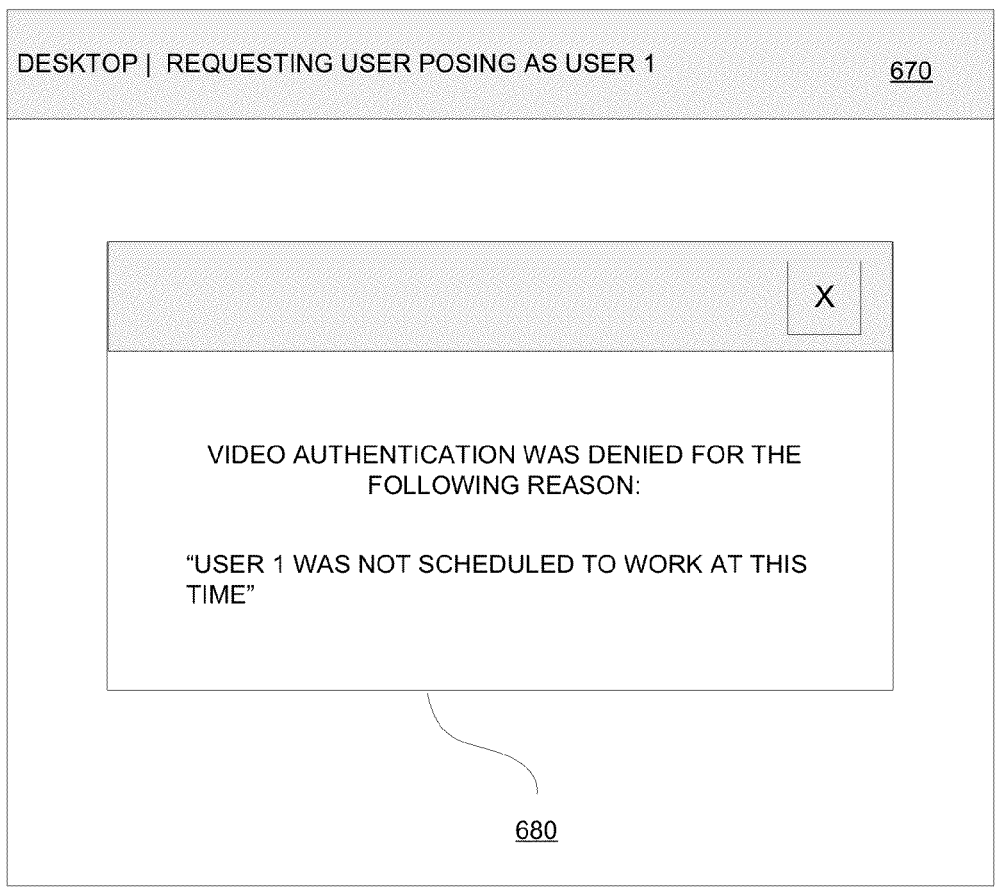
FIG. 6G is a screen shot of a client computer associated with the user initiating a log-in process including a window indicating that the authentication process was unsuccessful, in accordance with one embodiment of the present disclosure.

FIG. 6G is a screen shot 600G of a client computer associated with the user initiating a log-in process including a window indicating that the authentication process was unsuccessful, in accordance with one embodiment of the present disclosure. For instance, title bar 670 indicates that screen shot 600G is taken from the requesting user, who has failed to authenticate while posing as user 1. Window 680 provides a reason why the video authentication has failed. For instance, while the requesting user may have been user 1, as represented, user 1 is not scheduled to work at the time the log-in request was initiated. Another type of denial might be that the requesting user is falsely posing as user 1. Window 680 also might present as a field in which the supervisor is allowed to post reasons for allowance or denial of the video authentication process.

In another embodiment, periodic authentication of the now authorized user is performed. That is, on a random or periodic basis, the authorizing agent may initiate a follow-on authentication. In particular, the method includes sending a request for reauthorization from the second client computer to the first client computer. The request may be initiated by the authorizing agent, or automatically generated by an authentication server. A second image of the user is captured, with or without the cooperation of the user. Since it is a secondary authentication, the level of authentication need not be as formal, and cooperation by the user may not be necessary. The second captured image is delivered to the authentication server, and the authentication server provides the verified identification information related to the user to the second client computer. In one embodiment, the authentication server is bypassed, such that the second captured image is delivered from the first client computer to the second client computer. In that case, the verified information is stored in the second computer. A re-authentication of the user is performed by the authorizing agent based on the second image, the verified identification information. Also, continued access to the secure data center and/or resources located at the data center is controlled based on the result of the re-authentication.

In still another embodiment, a work environment of the now authorized user is evaluated. In particular, the work environment is evaluated by the same or another authorizing agent, such as, the authorized user's supervisor. Because there is a secure communication session between the secure data center and the client computer of the authorized user, that session may be utilized by the supervisor to evaluate the work environment in which the authorized user is operating. For instance, the supervisor is able to remotely control the video capture device located at the first client computer that is associated with the now authorized user. Control is activated or effected at the second client computer by the supervisor. For instance, the supervisor is able to remotely adjust a viewpoint of the image capturing device that is capturing an image of the work environment. In that manner, the supervisor is able to scan through the work environment at different angles. More particularly, the method for evaluating the workspace includes capturing one or more images of the work environment associated with the user. The one or more images are delivered to the second client computer associated with the supervisor for validation of the work environment. The authorizing agent is able to evaluate the work environment based on the captured one or more images and a standard to which the workstation must comply. Feedback is generated by the supervisor at the second client computer. For instance, the feedback may be positive, negative, or neutral, and is accompanied with comments and/or suggestions. The feedback is delivered from the second client computer to the first client computer of the now authorized user.

FIG. 5 is a flow diagram 500 illustrating a computer implemented method for performing two-factor authentication performed at an authentication server of a back-end data center, in accordance with one embodiment of the present disclosure.

In another embodiment, flow diagram 500 is implemented within a computer system including a processor and memory coupled to the processor and having stored therein instructions that, if executed by the computer system causes the system to execute a method for performing two-factor authentication performed at an authentication server of a back-end data center. In still another embodiment, instructions for performing a method are stored on a non-transitory computer-readable storage medium having computer-executable instructions for causing a computer system to perform a method for performing two-factor authentication performed at an authentication server of a back-end data center. The method outlined in flow diagram 500 is implementable by one or more components of the computer system 100 of FIG. 1. In embodiments, the method of flow diagram 500 is performed at the authentication server controlling access to a back-end data center.

In particular, at 510 the method includes receiving a request for authentication from a first client computer (e.g., the requesting user's computer). The request comprises user information associated with a log-in request initiated by a user at the first client computer to establish communication with a back-end data center, wherein the back-end data center provides computing resources (e.g., applications, information, etc.) for the first client computer. The request for authentication comprises an image of the requesting user captured from a live feed at the first client computer.

At 520, the method includes determining a representative user based on the first information. That is, the requesting user is representing himself or herself as the representative user, or put another way is trying to access resources at the back-end data center as the representative user.

At 530, the method includes determining an authorizing agent responsible for authorizing the representative user based on the first information. Since the representative user is known, any supervisor of the representative user may be determined through information in a corresponding user profile, or through information located in a relational database.

At 540, the request for authentication is delivered to a second client computer that is associated with the authorizing agent. In addition, at 550, verified identification information related to the representative user is also provided in the request for authentication. For instance, the verified identification information may include an official image of the representative user. In that manner, the authorizing agent is able to perform human implemented authentication of the user based on the first information, the captured image, and the verified identification information.

At 560, the method includes receiving a result of the authentication at the authentication server. At 570, the method includes controlling access by the first client computer associated with the requesting user to a secure data center based on the result of the authentication.

Thus, according to embodiments of the present disclosure, systems and methods are described providing for video enabled two-factor authentication including a human implemented video authentication of agents located at a remote workstation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for authentication, comprising:
  receiving a log-in request initiated by a user at a first client computer;
  capturing user information associated with said log-in request;
  capturing an image of said user from a live feed to said first client computer;
  sending in real-time a request for authentication of said user from said first client computer to an authentication server over a network, wherein said request for authentication comprises said user information and said image;
  determining a representative user based on said user information at said authentication server;
  at said authentication server, accessing verified identification information associated with said representative user;
  at said authentication server, determining an authorizing agent responsible for authorizing said representative user;
  sending said request for authentication from said authentication server to a second client computer associated with said authorizing agent, wherein said request comprises said user information and said image;
  receiving an acceptance of said request at said authentication server from said second client computer;
  in response to receipt of said acceptance, providing said verified identification information related to said representative user to said second client computer so that said authorizing agent can perform authentication of said user based on said user information, said image, and said verified identification information;
  receiving a result of said authentication at said authentication server from said second client computer; and
  controlling access over said network by said first client computer to one or more resources located at a secure data center based on said result.

2. The method of claim 1, wherein said controlling access further comprises:
  granting access based on a successful authentication; and
  denying access based on an unsuccessful authentication.

3. The method of claim 1, wherein said receiving a log-in request comprises:
  presenting a log-in window for authorizing access to a desktop operated by said first client computer;
  interrupting an authorization process associated with said log-in window;
  initiating a video capture on said first client computer, wherein said video capture is configured to capture at least one image; and
  requesting a capture of said image.

4. The method of claim 1, wherein said capturing an image further comprises:
  in response to activation of an activator, capturing said image that comprises a facial view of said user as aligned by said user;
  determining whether said image meets a threshold; and
  attaching said image to said request for authentication when said image meets said threshold.

5. The method of claim 1, further comprising:
  capturing an image of a work environment associated with said user;
  sending said image of a work environment to said second client computer associated with said authorizing agent for validation of said work environment;
  evaluating said work environment by said authorizing agent;
  receiving feedback on said work environment at said second client computer; and
  sending said feedback from said second client computer to said first client computer.

6. The method of claim 5, further comprising:
  remotely adjusting from said second client computer a viewpoint of a camera capturing said image of said work environment.

7. The method of claim 1, further comprising:
  sending a request for reauthorization from said second client computer to said first client computer;
  capturing a second image of said user;
  sending said second image to said second client computer;
  providing said verified identification information related to said user to said second client computer along with said second image; and
  performing re-authentication of said user by said authorizing agent based on said second image, and said verified identification information; and
  controlling access by said first client computer based on a result of said re-authentication.

8. The method of claim 1, wherein said providing verified identification information further comprises:
  accessing a previously captured image of said representative user associated with a successful authentication of said representative user, wherein said previously captured image was used for authenticating said user while processing a previous request for authentication; and
  attaching said previously captured image to said request for authentication for use in verifying said user in said request for authentication currently processed.

9. The method of claim 1, further comprising:
  authenticating said user information in association with said representative user;
  denying access based on an unsuccessful authentication of said user information; and
  sending said request for authentication to said second client computer based on a successful authentication of said user information.

10. The method of claim 1, wherein said first client computer is situated in a work-at-home environment.

11. The method of claim 1, wherein said first client computer is situated in a physical work station.

12. The method of claim 1, further comprising:
  establishing a remote communication session between said secure data center and said first client computer upon successful authentication of said user.

13. A method for authentication, comprising:
  receiving a request for real-time authentication from a first client computer over a network, wherein said request comprises user information associated with a log-in request initiated by a user at said first client computer to establish communication with a back-end data center, wherein said back-end data center provides computing resources for said first client computer over said network, and wherein said request comprises an image of said user captured from a live feed at said first client computer;

determining a representative user based on said user information;

accessing verified identification information associate with said representative user;

determining an authorizing agent responsible for authorizing said representative user;

sending said request for real-time authentication to a second client computer associated with said authorizing agent;

receiving an acceptance of said request from said second client computer;

in response to receipt of said acceptance, providing said verified identification information related to said representative user to said second client computer along with said request so that said authorizing agent can perform real-time authentication of said user based on said user information, said image, and said verified identification information;

receiving a result of said real-time authentication from said second client computer; and controlling access over said network by said first client computer to one or more resources located at said back-end data center based on said result.

14. The method of claim 13, wherein said providing verified identification information further comprises:

accessing a previously captured image of said representative user associated a successful real-time authentication of said representative user wherein said previously captured image was used for authenticating said user while processing a previous request for authentication; and attaching said previously captured image to said request for real-time authentication for use in verifying said user in said request for real-time authentication currently processed.

15. The method of claim 13, further comprising:

storing said captured image in said back-end data center based on a successful result.

16. The method of claim 13, further comprising:

authenticating said user information in association with said representative user;

denying access based on an unsuccessful authentication of said user information; and sending said request for authentication to said second client computer based on a successful authentication of said user information.

17. The method of claim 13, further comprising:

establishing a remote communication session between said secure data center and said first client computer based upon successful authentication of said user.

18. A system for authentication, comprising:

a first client computer associated with a user, said first client computer configured to receive a log-in request initiated by said user and capture user information associated with said log-in request;

an image capture device associated with said first client computer and configured to capture a live feed comprising a plurality of images, wherein said image capture device is configured to capture an image of said user from said live feed in association with said log-in request;

a back-end data center, wherein said back-end data center provides computing resources to a plurality of client computers, including said first client computer, wherein said back-end data center is configured and arranged to:

receive a request for real-time authentication over a network from said first client computer, wherein said request for real-time authentication comprises said user information and said image of said user, wherein said request is initiated by a user at said first client computer to establish communication with said back-end data center;

determine a representative user based on said user information;

accessing verified identification information associated with said representative user;

determine an authorizing agent responsible for authorizing said representative user;

send said request for real-time authentication to a second client computer associated with said authorizing agent, wherein said second client computer is supported by said back-end data center;

receive an acceptance of said request from said second client computer;

provide said verified identification information related to said representative user to said second client computer along with said request so that said authorizing agent can perform authentication of said user based on said user information, said captured image, and said verified identification information;

receive results of said authentication from said second client computer; and control access over said network by said first client computer to one or more resources located at said back-end data center based on said results.

19. The system of claim 18, wherein said image capture device is configured and adapted to:

in response to activation of a activator, capture said image that comprises a facial view of said user as aligned by said user;

determine whether said image meets a threshold; and attach said image to said request for authentication when said image meets said threshold.

20. The system of claim 18, wherein said first client computer is configured and arranged to:

present a log-in window for authorizing access to a desktop operated by said first client computer;

receive said user information;

interrupt an authorization process associated with said log-in window;

initiate said image capture device;

request a capture of said image of said user;

in response to activation of an activator by said user, capturing said image that comprises a facial view of said user as aligned by said user; and attaching said image to said request for authorization.

* * * * *